United States Patent

Gulati et al.

Patent Number: 6,012,292
Date of Patent: Jan. 11, 2000

[54] SYSTEM AND METHOD FOR TRANSFERRING CRYOGENIC FLUIDS

[75] Inventors: Kailash Canter Gulati, Dallas; Alan Jay Silverman, Plano, both of Tex.

[73] Assignee: Mobil Oil Corporation, Fairfax, Va.

[21] Appl. No.: 09/116,667

[22] Filed: Jul. 16, 1998

[51] Int. Cl.[7] ..................................................... F17C 3/00
[52] U.S. Cl. ............................................. 62/50.7; 62/53.1
[58] Field of Search ..................................... 62/50.7, 53.1

[56] References Cited

U.S. PATENT DOCUMENTS

| | | | |
|---|---|---|---|
| 2,348,478 | 5/1944 | Jones ........................................ | 62/53.1 |
| 2,969,092 | 1/1961 | Johnson ................................... | 62/50.7 |
| 3,068,026 | 12/1962 | McKamey ................................ | 62/50.7 |
| 3,466,886 | 9/1969 | Doose et al. ............................. | 62/50.7 |
| 3,563,572 | 2/1971 | French . | |
| 3,574,357 | 4/1971 | Tirgoviste et al. . | |
| 3,650,119 | 3/1972 | Sparling .................................. | 62/50.7 |
| 3,706,208 | 12/1972 | Kadi et al. ............................... | 62/50.7 |
| 3,777,502 | 12/1973 | Michie et al. . | |
| 3,986,341 | 10/1976 | De Haan . | |
| 3,992,169 | 11/1976 | Loudon . | |
| 4,011,732 | 3/1977 | Doherty et al. ......................... | 62/50.7 |
| 4,315,408 | 2/1982 | Karl . | |
| 4,667,390 | 5/1987 | Acharya et al. ........................ | 62/50.7 |
| 4,745,760 | 5/1988 | Porter ...................................... | 62/50.7 |
| 5,307,639 | 5/1994 | Boissin . | |

*Primary Examiner*—Ronald Capossela
*Attorney, Agent, or Firm*—Malcolm D. Keen

[57] ABSTRACT

A system and a method for transferring cryogenic fluids; e.g. transferring liquefied natural gas (LNG) between an offshore receiving/loading station and an onshore facility. The flow-line system which can be submerged in water is comprised of a main transfer conduit which is positioned within an outer jacket and a return conduit which is positioned within the main transfer conduit. The annulus between the jacket and the main conduit is insulated. Both the main conduit and the return conduit include means which allow the respective conduits to expand/contract with temperature changes.

16 Claims, 2 Drawing Sheets

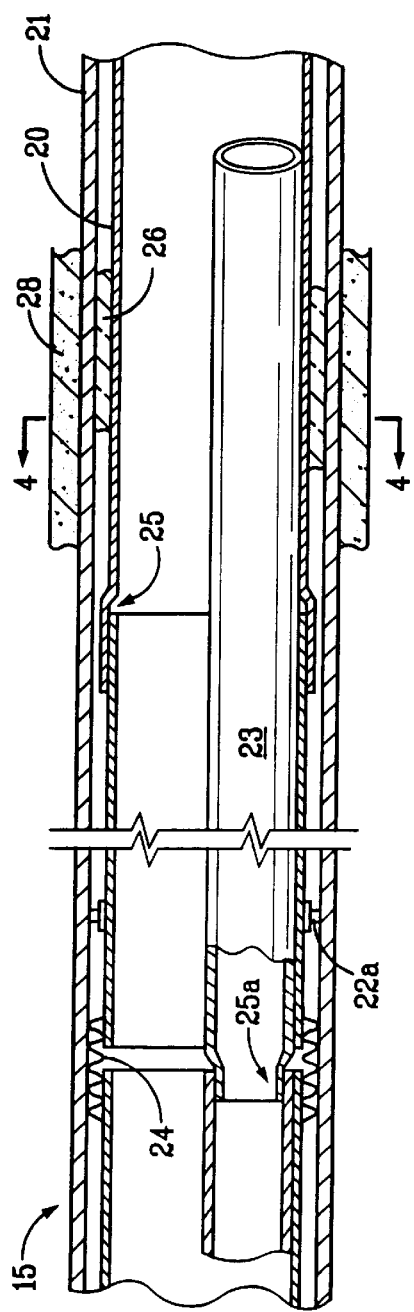
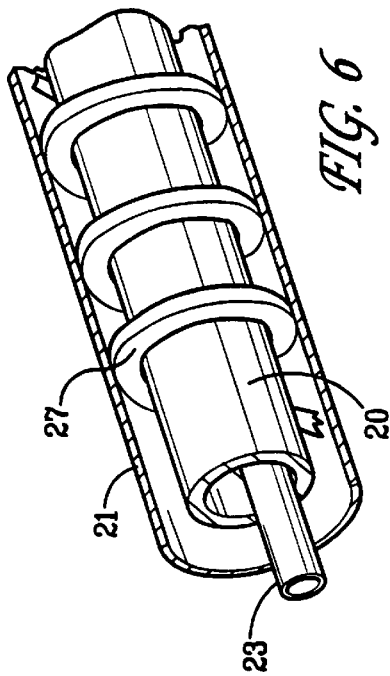
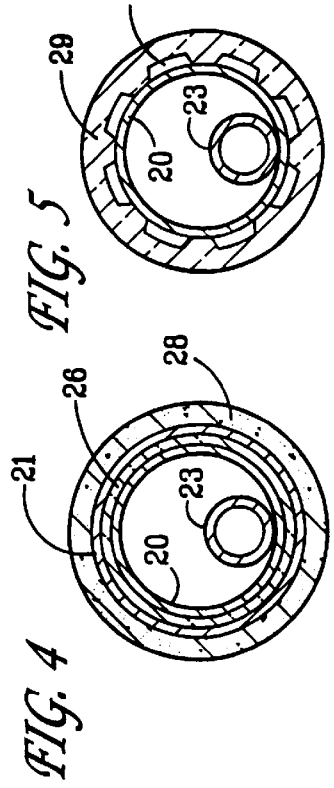
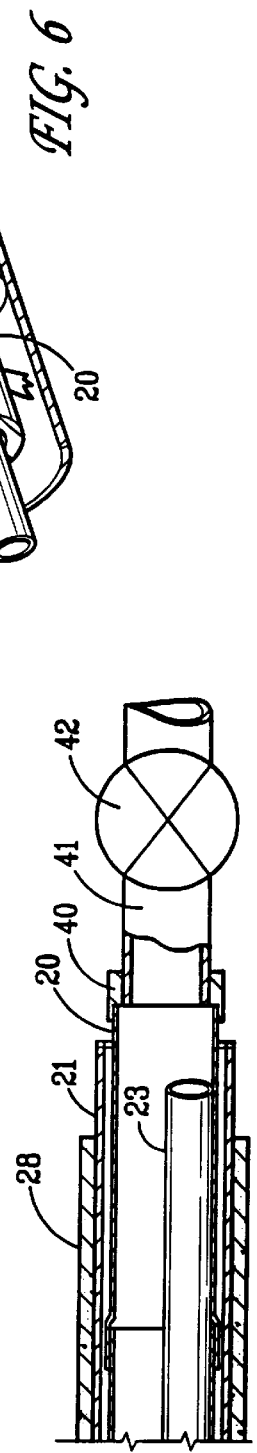
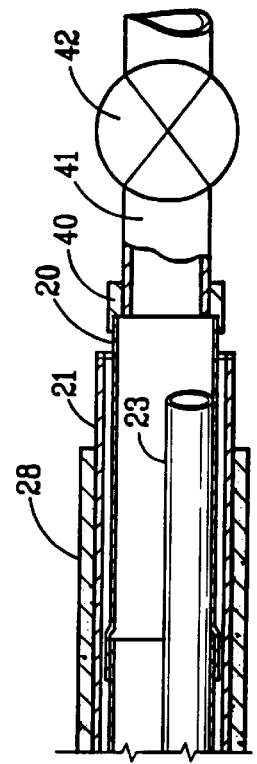

6,012,292

SYSTEM AND METHOD FOR TRANSFERRING CRYOGENIC FLUIDS

DESCRIPTION

1. Technical Field

The present invention relates to a system and method for transferring cryogenic fluids and in one aspect relates to a system and method for transferring cryogenic fluids such as Liquefied Natural Gas (LNG) between an offshore receiving/loading station and an onshore facility through a water-tight, insulated line assembly wherein one line is positioned within another to provide a circulating loop to thereby keep the line assembly cool during intervals in which no cryogenic fluid is being transferred. Further, the water-tight line assembly can be installed under water, either buried in or resting on the sea floor, wherein the assembly can traverse relatively long distances, e.g. one to six kilometers without interfering with surface traffic.

2. Background

Large volumes of natural gas (methane) are produced in many remote areas of the world. This gas has significant value where it can be economically transported to market. Where the production area is in reasonable proximity to the market and the terrain between the two permits, the gas can be transported through submerged and/or land-based pipelines. However, where the gas is produced in locations where laying a pipeline is infeasible or economically prohibitive, other techniques must be used in getting this gas to market.

Probably the most commonly used of these techniques involves liquefying the gas on site and then transporting the liquefied natural gas or "LNG" to market in specially-designed, storage tanks aboard a sea-going vessel. To form the LNG, natural gas is compressed and cooled to cryogenic temperatures (e.g.–160° C.), thereby substantially increasing the amount of gas which can be carried in the storage tanks. Once the vessel reaches its destination, the LNG is off-loaded into onshore, storage tanks from which the LNG can then be revaporized as needed and transported on to end users through pipelines or the like.

In both loading onto and off-loading LNG from a vessel, it is vitally important that the flowline system used for transferring the LNG between the vessel and the storage tank(s) onshore is one which is capable of being pre-cooled to cryogenic temperatures before the loading/off-loading operation is commenced and then maintaining these low temperatures during both the transfer operation and during the intervals between successive, transfer operations; i.e. the time interval between the completion of one transfer operation and the commencement of another.

The intervals between two successive loading/off-loading operations, each taking around 12 hours, may vary from relatively-short times (i.e. about one day) to significantly longer periods (i.e. 3 to 7 days or more). As will be understood by those skilled in the art, it is necessary to avoid repeated warming of the transfer line during these interval since the line would have to then be re-cooled before each transfer operation. This would be very time consuming which would result in substantial delays in the loading/off-loading of the vessels which, in turn, would substantially add to the transportation costs for the LNG. Further, any repeated warming and cooling of the line induces stresses in the line which, in turn, are likely to cause early failure of the system.

In known prior art flowline systems of this type, the flowline system is initially cooled and then maintained at cryogenic temperatures by circulating LNG from the shore through a main transfer line and then back to shore through a separate return line which, in turn, runs along and outside of the main flowline. This circulation of LNG is normally maintained during those idle periods, typically 3–7 days, between consecutive transfer operations which, in turn, may last only about 12 hours. During the actual transfer operation, flow through both of the circulation lines can be in one direction so that both lines can be used in transferring the cryogenic fluid to or from the vessel.

Typically, both of the individual circulation lines are insulated to minimize heat leak into the transfer line at all times thereby preventing excess vaporization of the LNG within the transfer line. While such flowline systems are known and have functioned successfully in the past, most suffer drawbacks which detract from their economical use in many environments.

For example, presently-known cryogenic fluid (LNG) transfer systems can not be submerged in water and thus must be installed on trestles or causeways specially built between the onshore tank(s) and the offshore receiving/loading stations. These trestles must be sufficiently high above the water's surface to preclude exposure of the transfer line to the water and in some cases to avoid interfering with existing marine traffic on the surface. The costs associated with trestle construction often demands that the receiving station be located close to shore (e.g. within 1500 meters or so) which, in turn, may require the dredging of new access channels and the building of additional harbor facilities to insure safe passage for the deep-draft LNG transport vessels.

Also, the return line used to circulate LNG during the idle periods is made-up and insulated separately from the main transfer line of the flowline system, thereby significantly adding to the costs, complexity, and the safety concerns of the transfer system. Accordingly, a need exists for a cryogenic flowline system which can be installed under water so that it does not interfere with surface traffic thereby allowing vessels to be loaded/off-loaded farther off-shore, thereby adding to the safety of the public during such operation. Also, since no trestles would have to be constructed, the capital costs of such a system would be substantially reduced.

SUMMARY OF THE INVENTION

The present invention provides a system and a method for transferring cryogenic fluids; e.g. transferring liquefied natural gas (LNG) between an offshore receiving/loading station and an onshore facility. The flowline system is one which can be submerged in the water thereby allowing the receiving/loading station to be located at greater distances from shore which, in turn, eliminates the need to dredge access channels and build expensive port facilities in areas where they would otherwise be required to handle deep-draft LNG vessels.

Basically, the present flowline system is comprised of a main transfer conduit which is positioned within an outer jacket comprised of a durable, wear-resistant material (e.g. carbon steel) and includes a means for insulating the annulus formed between the jacket and the main transfer conduit. The means for insulating the annulus may be comprised of any appropriate insulative material (e.g. expanded plastic foam, multi-layer insulation, aerogels, or the like) or a vacuum may be applied to the annulus or the two may be combined.

A smaller-diameter return conduit is positioned within the main transfer conduit and extends substantially therethrough. Both the main transfer conduit and the return conduit, when constructed of materials which undergo expansion/contraction with changes in temperature, include means for allowing each to expand and contract with respect to each other and to the jacket. These means may be any appropriate connecting means which allows the conduits to expand and contract between adjacent lengths of respective conduits which make up the main transfer conduit and the return conduit; e.g. bellows, slip-joints, or the like. Where these conduits are constructed of material (e.g. 36% nickel-steel known as Invar) which induces little stress on the line assembly when cooled to LNG temperature, no expansion joints will be needed.

In operation, the flowline system is fluidly connected between the offshore receiving/loading station and the onshore facility and is submerged into the water. Cryogenic fluid is then circulated through the main transfer conduit and the return conduit which is positioned inside the main transfer conduit until the two conduits reach a cryogenic temperature. This circulation is continued until a cryogenic fluid transfer between the vessel and the onshore facility is commenced. At that time, the direction of flow through the return conduit is reversed whereby the cryogenic fluid being transferred will now flow in the same direction through both conduits during the transfer operation. Once the operation is completed, the flow through the return conduit is again reversed and cryogenic fluid is circulated through the system to maintain the system at the desired temperatures during intervals when no transfer operation is being carried out; i.e. intervals between the loading/offloading of two consecutive LNG vessels.

BRIEF DESCRIPTION OF THE DRAWINGS

The actual construction operation, and apparent advantages of the present invention will be better understood by referring to the drawings, not necessarily to scale, in which like numerals identify like parts and in which:

FIG. 3 is an elevational view, partly in section and broken away, of the cryogenic, flowline system of the present invention;

FIG. 4 is a sectional view taken along line 4—4 of FIG. 3;

FIG. 5 is a sectional view of another embodiment of the present invention;

FIG. 6 is a perspective view, partly broken away, of still a further embodiment of the present invention; and FIG. 7 is a elevational view, partly in section illustrating one end of the flowline system of FIG. 3.

BEST KNOWN MODE FOR CARRYING OUT THE INVENTION

Figure 1:
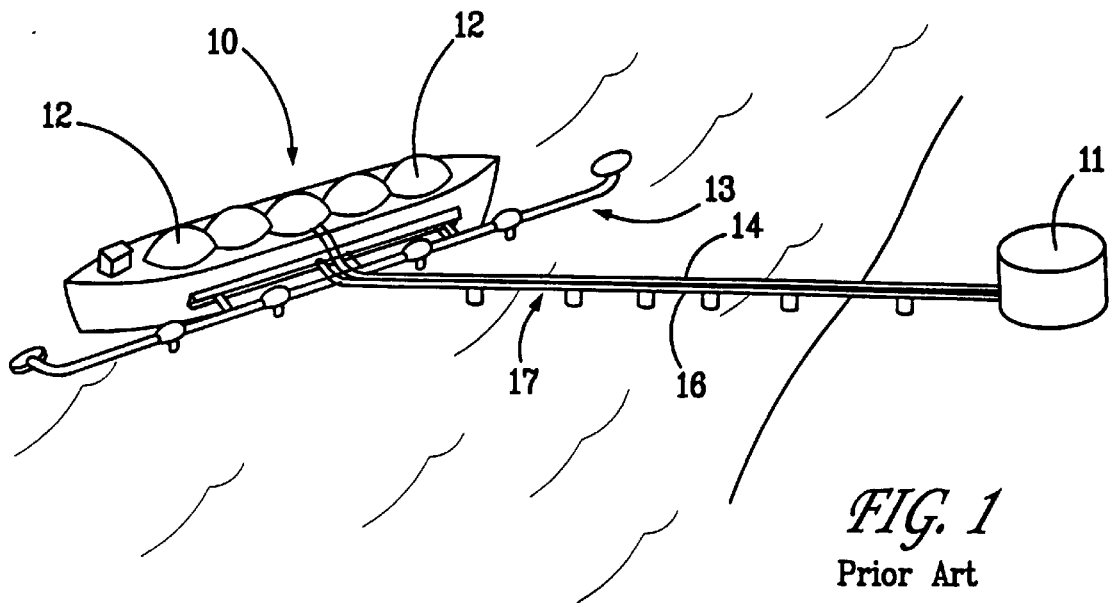
FIG. 1 is an illustration of a prior-art flowline system as used in transferring cryogenic fluids between a sea-going vessel and onshore facilities.

Referring more particularly to the drawings, FIG. 1 illustrates a typical, prior-art system for transferring a cryogenic fluid, i.e. liquefied natural gas (LNG), between sea-going vessel 10 and storage tank(s) 11 on shore. Vessel 10 is of the type having a plurality of specially-designed tanks 12 which, in turn, store the LNG. Vessel 10 is moored to receiving/loading station 13 which, in turn, is a permanent structure which is constructed and supported at some distance from shore. Two flowlines 14, 16 extend from onshore facility 11 to vessel 10 and both are supported above the water's surface on trestle 17 as will be understood. A cryogenic fluid, e.g. LNG, is circulated through lines 14 and 16 to keep the lines at the desired low temperatures during those intervals between transfer operations. During a transfer operation, the LNG can be flowed in the desired direction through both lines 14, 16.

Prior art flowline systems of this type require the laying and maintaining of two separate lines, i.e. 14, 16, both of which are exposed to the atmosphere and as such, both must be adequately insulated to prevent excessive heat leakage. The costs involved in building and maintaining trestle 16 can be substantial. Also, the length of a typical trestle in most locations is limited by not only the costs involved but also by the maritime traffic in the area. That is, the trestle can not extend too far offshore without interfering with surface traffic and thus, will not be permitted in most areas.

Further, due to the manner in which the flowlines 14, 16 are constructed in known prior-art transfer systems of this type, it has been not practical or technically feasible to submerge the flowlines in water between the shore and the receiving station. The insulated, outer surfaces offer no protection against exposure to water, which if permitted, will degrade insulation to beyond where it is useful as an insulator.

Figure 2:
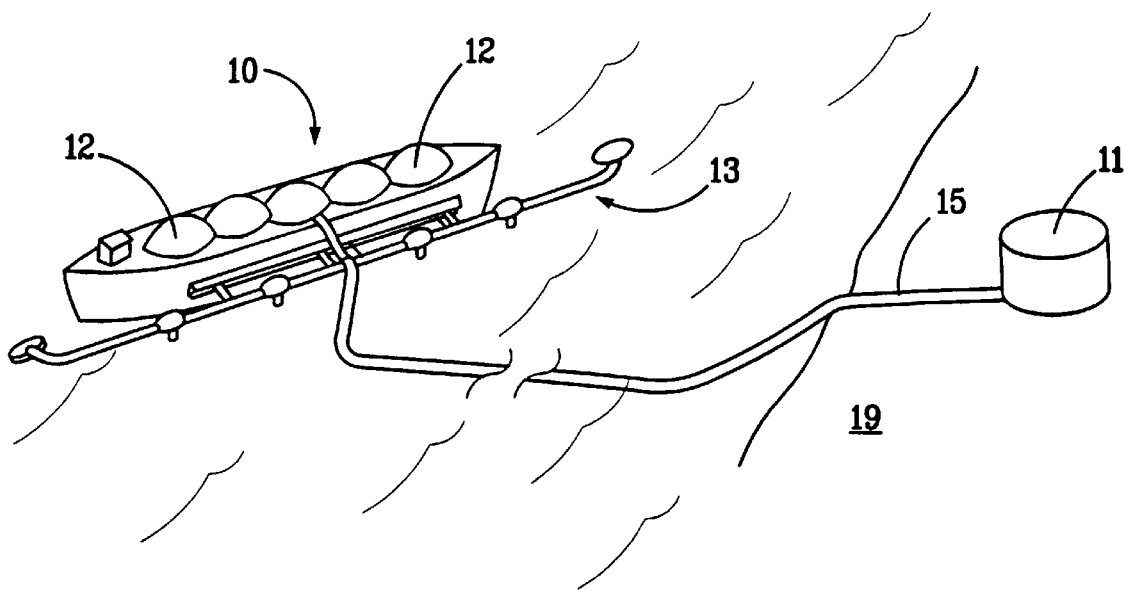
FIG. 2 is an illustration of a flowline system in accordance with the present invention as used in transferring cryogenic fluids between a sea-going vessel and onshore facilities.

Referring now to FIG. 2, there is illustrated the vessel 10 moored at receiving/loading station 13 wherein the tanks 12 aboard the vessel are fluidly connected to the onshore facility 11 by the flowline system 15 of the present invention. As illustrated, system 15 is installed on the sea floor, either buried in a specially prepared trench (not shown) and then covered with soil or merely resting, unburied, on the sea floor. As will be more fully explained below, LNG can either be loaded or off-loaded between vessel 10 and facility 11 on the shore 19 through flowline system 15.

Referring now to FIG. 3, cryogenic flowline system 15 is comprised of a main transfer line or conduit 20 which is concentrically-positioned within outer jacket 21 to thereby form an annulus 22 therebetween. Conduit 20 may be centered in jacket 21 by means of centralizers 22a (only one shown for clarity) or the like which, in turn, are spaced along conduit 20. Positioned within main transfer conduit 20 and extending therethrough is return line or conduit 23. As shown, return conduit lies on the lower, inner surface of conduit 20 and does not need to be centered therein.

Since jacket 21 is effectively isolated from the temperature changes experienced by the main transfer conduit 20 and return conduit 23, it does not undergo any substantial expansion or contraction. Accordingly, jacket 21 can be made of lengths of a strong and corrosive-resistant material (e.g. lengths of 40–42 inch diameter, carbon steel casing or the like) which, in turn, are joined by welding, threaded couplings, etc.). However, since both main transfer conduit 20 and return conduit 23 will carry fluids at cryogenic temperatures, it is necessary that each conduit is able to expand and contract independently with respect to each other and with respect to jacket 21 in response to the changes in temperature.

Accordingly, each conduit 21, 23 is made-up of lengths of conduit or tubing (e.g. lengths of 32 inch ID and 10 inch ID conduit respectively, of stainless steel or the like) which, in turn, are coupled together by expansion joints which allow each conduit to expand and contract independently of the other without rupturing or buckling. Any joint which allows the necessary expansion can be used. For example, a bellows 24 can be welded or otherwise secured between adjacent joints of conduit 20 or conduits 23, as will be understood in the art or a simple "slip-joint" 25, 25a can be used. It is only important that conduits 20 and 21 can expand and contract and that they can do so independently of each other. Small leakage from conduit 23 into main transfer conduit 20 can be tolerated but there should be no leakage from conduit 20 into jacket 21.

Conduits 21, 23 may also be constructed of materials which experience very little expansion/contraction in response to changes in temperature, (36% nickel-steel, known as Invar and certain composite materials). When constructed of such materials, conduits 21, 23 will need no expansion joints but, instead, can be assembled by merely welding adjacent lengths of the respective conduits together.

Annulus 22 between conduits 20 and jacket 21 is insulated to substantially alleviate heat leakage into system 15 from the surrounding environment. This may be accomplished in a variety of ways. For example, annulus 22 may be (a) evacuated with a vacuum being maintained therein; (b) filled with insulative material, e.g. multi-layer insulation or expanded plastic foam 26; or (c) these two insulating techniques may be combined. That is, annulus 22 can be filled with a cellular, permeable foam insulation 26, or wrapped with stripped insulation 27 (FIG. 6) which, in turn, still allows a vacuum to be pulled within annulus 22.

Any appropriate insulative material can be used; e.g. multi-layer insulation, aerogels, loose-fill insulation, permeable or closed cell expanded plastic foams, etc. However, any insulation material positioned within annulus 22 will have to be such as to still allow expansion of conduit 20 with respect to jacket 21. Also, in some embodiments, jacket 21 may be encased in a layer of concrete 28 (FIGS. 3 and 4) to provide stability to the system 15 against wave, current, buoyancy, or other forces.

In the embodiment illustrated in FIG. 5, the jacket 21 is replaced with a cylinder of material 29, e.g. structural plastic, etc., which has longitudinally-extending passages 30 formed therein. Cylinder 29 is positioned around main transfer conduit 20 and a vacuum is pulled through passages 30.

In operation, cryogenic flowline system 15 is installed at a location where a cryogenic fluid is to be transferred between two points. As illustrated in FIG. 2, system 15, which is submerged and installed on the sea floor, is connected between offshore receiving/loading station 13 and a facility 11 on shore 19. As will be understood, flowline system will be left in place once it has been installed. The outer ends of main transfer conduit 20 and return conduit 23 can be fluidly connected by the appropriate valving (see FIG. 7) which can be positioned on offshore station 13 to provide a loop for flow through system 15. As shown, the outer end of main conduit 20 is closed by a cap 40 or the like, having a supply line 41 connected thereto which, in turn, has a valve 42 therein. When valve 42 is closed, LNG will flow from main conduit 20 into the open end of return line 23 to provide the circulation path for the LNG. When valve 42 is open, LNG will flow from supply line 41 into both main conduit 20 and return line 23.

LNG or other cryogenic fluid is then flowed from facility 11, through conduit 20, and back to facility 11 through the inner return conduit 23 to cool and maintain flowline system 15 at the cryogenic temperature. By cooling and maintaining the flowline system 15 at these low temperatures and by properly insulating the flowlines, vaporization of the LNG within the system is minimized. Also, it should be recognized that this circulation of the LNG can be reversed in some instances without departing from the present invention; i.e. LNG is flowed through the return line 23 and is returned through the main conduit 20.

Once the flowline system 15 reaches its desired temperature, the appropriate valving within the system is switched so that flow through both main transfer conduit 20 and that through return conduit 23 will now be in the same direction. That is, if vessel 10 is being off-loaded, LNG will flow to facility 16 on shore 19 through both conduits 20 and 23. When loading, all of the flow will be from the facility 16 to vessel 10. By positioning the return conduit 23 within main conduit 20, construction and maintenance of the transfer line system is greatly simplified in that separate insulation and installation of return conduit 23 is not required. Also, present system 15 provides other advantages over the prior art systems by lowering costs of operation because the total heat leak into a single main conduit 20 is smaller than the heat leak into the two separate lines of the prior art systems.

While the flowline system of the present invention has been described as one which can be submerged in water thereby allowing the receiving/loading station to be placed at greater distances from shore (i.e. from 1 to about 6 kilometers), it should be recognized that it can also be supported above the surface of the water on trestles or the like where the receiving/loading station can be positioned close to shore.

What is claimed is:

1. A flowline system for transferring cryogenic fluids, said system comprising:

a main transfer conduit;

a jacket positioned around said main transfer conduit and forming an annulus therebetween;

means for insulating said annulus between said main transfer conduit and said jacket; and a return line positioned within said main transfer conduit and extending substantially through the length of said main transfer conduit.

2. The flowline system of claim 1 wherein said means for insulating said annulus comprises:

a vacuum throughout said annulus.

3. The flowline system of claim 1 wherein said means for insulating said annulus comprises:

insulative material substantially filling said annulus.

4. The flowline system of claim 3 wherein said insulative material is selected from the group of multi-layer insulation, aerogels, loose-fill insulation, permeable cell expanded plastic foam, and closed cell expanded plastic foam.

5. The flowline system of claim 1 wherein said means for insulating said annulus comprises:

an insulative means substantially filling said annulus and a vacuum said throughout said annulus.

6. The flowline system of claim 1 wherein said main transfer conduit includes means for allowing said main transfer conduit to expand and contract with respect to said jacket in response to changes in temperature.

7. The flowline system of claim 6 wherein said return conduit includes means for allowing said return conduit to expand and contract with respect to said main transfer conduit in response to changes in temperature.

8. The flowline system of claim 7 wherein said main transfer conduit is comprised of lengths of conduit and wherein each of said expansion and contraction means in said main transfer conduit is comprised of a bellows which is connected between adjacent lengths of said main transfer conduit.

9. The flowline system of claim 7 wherein said return conduit is comprised of lengths of conduit having a diameter less than that of said main transfer conduit and wherein each of said expansion and contraction means in said return conduit is comprised of a bellows which is connected between adjacent lengths of said return conduit.

10. The flowline system of claim 7 wherein said main transfer conduit is comprised of lengths of conduit and wherein each of said expansion and contraction means in said main transfer conduit is comprised of a slip joint which connects adjacent lengths of said main transfer conduit.

11. The flowline system of claim 7 wherein said return conduit is comprised of lengths of conduit having a diameter less than that of said main transfer conduit and wherein each of said expansion and contraction means in said return conduit is comprised of a slip-joint which is connects adjacent lengths of said return conduit.

12. A system for transferring cryogenic fluids between an receiving/loading station positioned offshore in a body of water and an onshore facility, said system comprising:

a flowline system fluidly connecting said onshore facility to said offshore receiving/loading station, said flowline system being submerged in said body of water over substantial the length thereof; said flowline system comprising:

a main transfer conduit;

a jacket positioned around said main transfer conduit and forming an annulus therebetween;

means for insulating said annulus between said main transfer conduit and said jacket; and a return line positioned within said main transfer conduit and extending substantially through the length of said main transfer conduit.

13. The system of claim 12 wherein said main transfer conduit includes means for allowing said main transfer conduit to expand and contract with respect to said jacket in response to changes in temperature and wherein said return conduit includes means for allowing said return conduit to expand and contract with respect to said main transfer conduit in response to changes in temperature.

14. The system of claim 13 wherein said jacket is encased in a layer of concrete.

15. A method of transferring cryogenic fluids from a receiving/loading station positioned offshore in a body of water and a facility onshore, said method comprising:

fluidly connecting an insulated main transfer conduit between said receiving/loading station and said facility;

submerging said insulated main transfer conduit in said body of water;

circulating cryogenic fluid between said facility and said receiving/loading station through said main transfer conduit and a return line which is positioned within said main transfer conduit until the main transfer conduit and said return conduit reach a cryogenic temperature;

reversing the direction of flow within said return conduit when the transfer of cryogenic fluid is commenced whereby said cryogenic fluid will flow in the same direction through both said main transfer conduit and said return line until said cryogenic transfer is completed.

16. The method of claim 15 including:

reversing the direction of flow within said return conduit when said transfer is completed to re-establish circulation through said main transfer conduit to thereby maintain said main transfer conduit at a cryogenic temperature during periods between said transfers of cryogenic fluids.

* * * * *